United States Patent
Bless et al.

(10) Patent No.: US 9,256,931 B2
(45) Date of Patent: Feb. 9, 2016

(54) METHOD FOR INSPECTING AT LEAST ONE COPY OF A PRINTED PRODUCT

(71) Applicant: KOENIG & BAUER AKTIENGESELLSCHAFT, Würzburg (DE)

(72) Inventors: Stefan Bless, Detmold (DE); Carsten Diederichs, Lemgo (DE); Felix Hartmann, Versmold (DE); Jorn Sacher, Hiddenhausen (DE)

(73) Assignee: KOENIG & BAUER AG, Wurzburg (DE)

( * ) Notice: Subject to any disclaimer, the term of this patent is extended or adjusted under 35 U.S.C. 154(b) by 0 days.

(21) Appl. No.: 14/420,676

(22) PCT Filed: Jun. 27, 2013

(86) PCT No.: PCT/EP2013/063458
§ 371 (c)(1),
(2) Date: Feb. 10, 2015

(87) PCT Pub. No.: WO2014/029532
PCT Pub. Date: Feb. 27, 2014

(65) Prior Publication Data
US 2015/0243007 A1    Aug. 27, 2015

(30) Foreign Application Priority Data

Aug. 24, 2012 (DE) .................... 10 2012 215 114

(51) Int. Cl.
*G06K 9/00* (2006.01)
*G06T 7/00* (2006.01)
*B41F 33/00* (2006.01)
*B41F 11/02* (2006.01)

(52) U.S. Cl.
CPC ................. *G06T 7/001* (2013.01); *B41F 11/02* (2013.01); *B41F 33/0036* (2013.01); *B41F 33/0081* (2013.01); *G06T 2207/10004* (2013.01); *G06T 2207/20081* (2013.01); *G06T 2207/30168* (2013.01)

(58) Field of Classification Search
CPC ............. B01J 2219/00527; B01J 2219/00533; B01J 2219/00585; B01J 2219/00596; B01J 2219/00605; B01J 2219/00617; B01J 2219/00659; B01J 2219/00689; B01J 2219/00695; B01J 2219/00707; B82Y 15/00; G01N 2035/00158; G01N 2035/0494; G01N 27/4471

See application file for complete search history.

(56) References Cited

U.S. PATENT DOCUMENTS

| 5,724,437 A | 3/1998 | Bucher et al. |
| 5,967,049 A * | 10/1999 | Seymour et al. ............. 101/484 |
| 6,318,260 B1 * | 11/2001 | Chu et al. ..................... 101/365 |

(Continued)

FOREIGN PATENT DOCUMENTS

| DE | 43 21 177 A1 | 1/1995 |
| DE | 102004021047 B3 | 10/2005 |

(Continued)

*Primary Examiner* — Tom Y Lu
(74) *Attorney, Agent, or Firm* — Mattingly & Malur, PC

(57) ABSTRACT

A method is used for inspecting at least one copy of a printed product. At least one element, which is spatially constant with respect to a fixed reference point and at least one element which is spatially variant with respect to the same fixed reference point are reliably inspected by reference image data being used for a desired-actual value comparison of the at least one spatially variant element. The reference image data takes account of the variable position of the at least one element; i.e. the spatial variance thereof.

17 Claims, 3 Drawing Sheets

(56) References Cited

U.S. PATENT DOCUMENTS

| | | | |
|---|---|---|---|
| 6,522,430 B1 * | 2/2003 | Dalal et al. | 358/406 |
| 6,968,076 B1 * | 11/2005 | OuYang et al. | 382/112 |
| 7,957,576 B2 * | 6/2011 | Kitani | 382/135 |
| 8,311,279 B2 * | 11/2012 | Quarfordt et al. | 382/103 |

FOREIGN PATENT DOCUMENTS

| | | |
|---|---|---|
| EP | 2001680 | 12/2008 |
| EP | 2 017 082 A1 | 1/2009 |
| WO | 9736260 A1 | 10/1997 |
| WO | 2007107234 A1 | 9/2007 |

* cited by examiner

METHOD FOR INSPECTING AT LEAST ONE COPY OF A PRINTED PRODUCT

CROSS-REFERENCE TO RELATED APPLICATIONS

The subject application is the U.S. National Phase, Under 35 U.S.C. §371, of PCT/EP2013/063458, filed Jun. 27, 2013, published as WO 2014/029532 A2 and A3 on Feb. 27, 2014 and claiming priority to DE 10 2012 215 114.1, filed Aug. 24, 2012, the disclosures of which are expressly incorporated herein by reference.

FIELD OF THE INVENTION

The present invention relates to a method for inspecting at least one copy of a printed product. At least one first copy of the printed product and at least one second copy of the same printed product are produced in a printing process carried out in a printing machine. A photographic image of at least the first copy of the printed product is generated. During a learning phase of the inspection system, a photographic image of at least one element of the first copy of the printed product, and which is spacially variant with respect to a reference point that is fixed for the copy in question, is separated, from a photographic image of the first copy of the printed product, of at least one element which is spacially constant with respect to the same reference point. The image of the at least one spacially constant element obtained from the photographic image of the at least one first copy of the printed product is used as a reference image for the one spacially constant element. The image of the at least one spatially variant image is used as another reference image for the spatially variant element.

BACKGROUND OF THE INVENTION

DE 10 2004 021 047 B3 discloses a method for comparing an image with at least one reference image using a system which comprises at least one image capturing unit and an image processing system, equipped with a logic unit, for evaluating image data from the image capturing unit. An image captured by the image capturing unit is compared with the at least one reference image, with the logic unit carrying out the image comparison. The image comparison evaluates the quality of printed matter produced by a printing machine. The logic unit evaluates the quality of the printed matter with respect to a multiplicity of criteria while a production process is running on the printing machine, with the evaluation of the quality of the printed matter produced by the printing machine being divided into at least two process units. The image capturing unit transmits the image data, captured by its image sensor, as digital data to the logic circuit.

DE 43 21 177 A1 discloses a method for inspecting an image on at least one printed product produced in a printing machine. All relevant digital image data for the printed product are compared in a computer device through a desired value/actual value comparison with desired data for an o.k. image. A method of this type will necessarily result in an error message if, at the time the image data are recorded, the printed product is itself spatially variant or has at least one element which is spatially variant with regard to a reference point which is fixed in relation to said printed product.

EP 2017 082 is directed to a method involving detecting a periodic status signal of a marking element and optically detecting a portion of a continuous web, such as a printing web, and converting into data. The data is stored to synchronize a respective origin of an exact repeating pattern with subsequent repeating pattern and/or similarly formed printing web. A grey vector and/or a color vector are estimated by the optical detection of the printing web.

In security printing in particular, but also in premium quality package printing, printed products are produced, e.g. banknotes or security documents or folding boxes, which have at least one element which is spatially variant with regard to a fixed reference point, with said reference point being designed as fixed, i.e. spatially fixed, in relation to the printed product or the copy of said printed product in question. A spatially variant element of this type may be a shiny strip, in particular a pearlescent strip or Iriodin strip, for example, incorporated into the printed product in question and/or into a copy of said printed product. When the printed product in question or the copy of said printed product is tilted against a light source, an Iriodin strip will appear as a shiny strip, the color of which changes, e.g. from bright yellow to golden yellow, and then disappears. Shiny strips are used on banknotes in particular as a security feature. In a series comprising multiple copies of printed products that are each provided with a shiny strip, e.g. when a multiplicity of banknotes are produced as copies in security printing, a shiny strip of this type can be spatially variant with regard to a fixed reference point, e.g. an edge of the copy of the printed product in question or the center thereof, from one copy to the next copy of the printed product in question, depending on the production process. This means that, in an inspection of this series of copies of said printed product, the position of the shiny strip may change at least slightly from one copy of the printed product to another copy in the same series of the printed product, and may deviate from an anticipated position, wherein this deviation may be irregular and without a preferred direction. In an inspection using a spatially fixed image capturing device and a conventional desired value/actual value comparison, in which current image data are compared with previously established statistical reference image data, e.g. taken from a prepress, this variability in the alignment and/or positioning of the spatially variant element, designed, e.g. as a shiny strip, will result in an error message.

SUMMARY OF THE INVENTION

The object of the present invention is to devise a method for inspecting at least one copy of a printed product, which is also suitable for inspecting copies of the printed product in question that have at least one spatially variant element.

The object is attained according to the invention wherein, during the inspection, which follows the learning phase, a photographic image of the at least one second copy of the printed product is likewise generated by use of the image capturing device of the inspection system. From the photographic image generated during the inspection of the at least one second copy of the printed product, a photographic image, contained therein, of at least one element which is spatially variant, with regard to a reference point that is fixed for the copy in question, is separated from a photographic image, contained in the same generated photographic image of the relevant second copy of the printed product, of at least one element which is spatially constant with regard to the same fixed reference point. The photographic image of the at least one spatially constant element contained in the photographic image of the at least one second copy of the printed product, is compared with the reference image obtained from the at least one first copy of the printed product and corresponding to the at least one spatially constant element. The photographic image of the at least one spatially variant element contained in the same photographic image of the same at least one second copy of the printed product, is compared with the respective reference image obtained from the at least one first copy of the printed product and corresponding to the relevant spatially variant element.

The advantages achieved by the invention are particularly that, in addition to spatially constant elements, spatially variant elements of a copy of the printed product in question can be reliably inspected. This is achieved by using reference image data which take the variable position of the at least one spatially variant element, i.e. the spatial variance thereof, into consideration in the desired value/actual value comparison of said at least one element.

BRIEF DESCRIPTION OF THE DRAWINGS

An embodiment example of the present invention is represented in the accompanied set of drawings, and will be specified in greater detail in the following.

The drawings show.

DESCRIPTION OF THE PREFERRED EMBODIMENT

Figure 1:
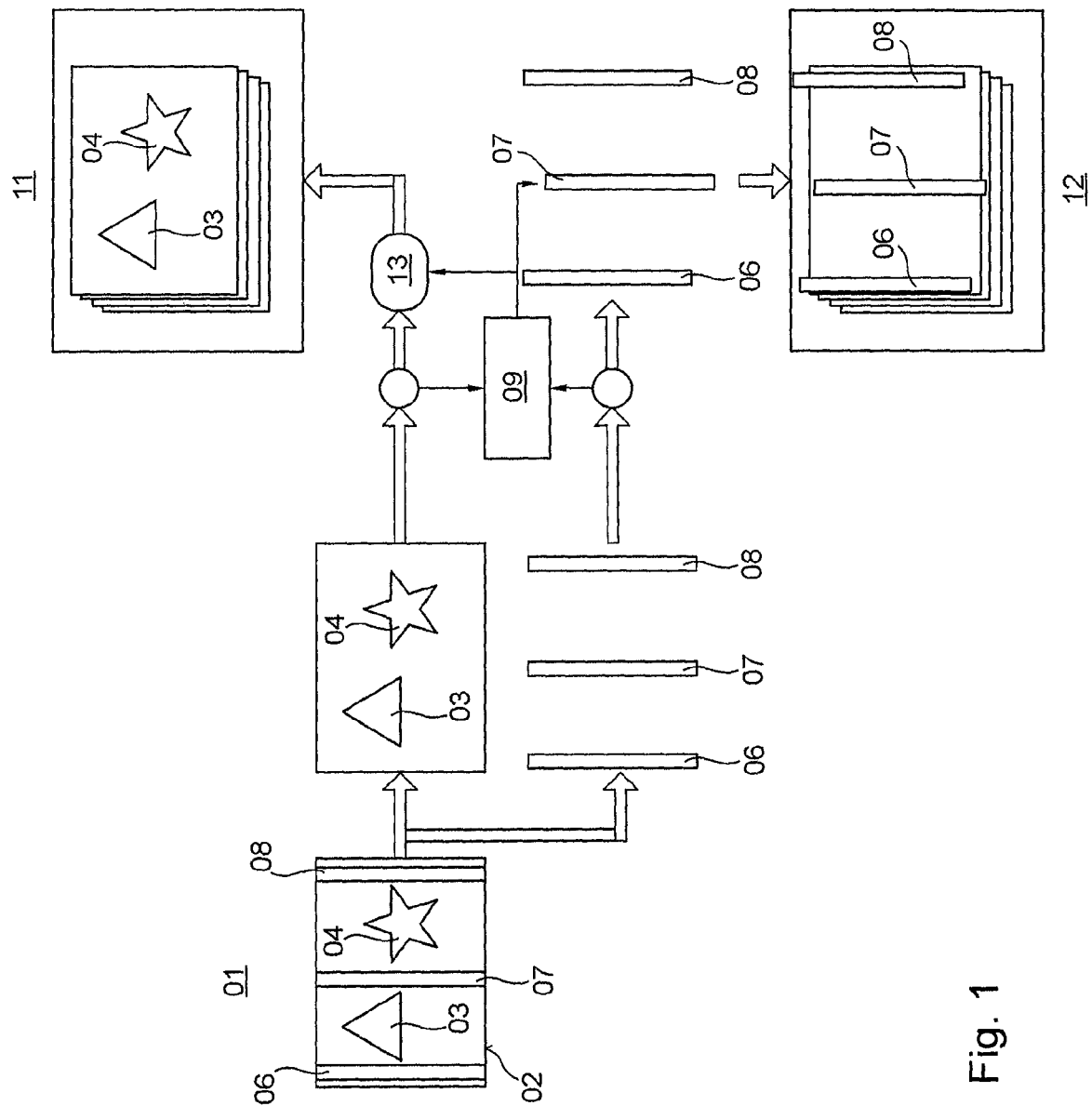
FIG. 1 a block diagram illustrating the preparation phase for inspection of at least one copy of the printed product.

FIG. 1 shows a block diagram illustrating a number of process steps in preparation for an inspection of preferably a plurality of copies of a printed product, wherein during this inspection, in particular a surface of the copy of the printed product in question which bears a printed image will be inspected. This preparation for inspection of the printed product involves a so-called learning phase for a system that will be used for the inspection in particular for executing a program in a control unit, during which learning phase at least one suitable reference image for the inspection to follow later is generated and made available, wherein during the actual inspection, which follows the learning phase, a currently generated image of at least one copy of the printed product in question is compared with said reference image generated during the learning phase, with the reference image representing a defect-free image of the relevant printed image of at least one copy of the printed product to be inspected.

In a first process step, to generate the reference image, a photographic image 01 of at least one copy, but preferably of a plurality of copies, of the printed product to be inspected is generated by means of an image capturing device used by the inspection system. Imaging is preferably carried out in a printing machine, e.g. in a rotary printing machine, in particular in a sheet-fed rotary printing machine, during a production run in which multiple copies of the printed product in question are being produced. The printing machine produces, e.g. banknotes or other security documents as the printed product, with a multiplicity of these banknotes or security documents being preferably arranged together on one printed sheet, and with the printing machine printing a multiplicity, in particular several thousand, of such printed sheets during a given production run, i.e. during a running printing process, wherein, depending on the inspection system that is used, for example, each of said printed sheets and/or each individual banknote arranged on one of said printed sheets and/or each individual security document is considered to be one copy of said printed product. The photographic image 01 of the at least one copy, and preferably each of the photographic images 01 of the respective plurality of copies of the printed product in question, is or are generated by the image capturing device of the inspection system, e.g. by an optoelectronic camera, in particular a semiconductor camera designed, e.g. as a line scan camera, so that each photographic image 01 of the respective copies of the printed product in question is supplied in the form of digital image data, e.g., to the control unit, which is situated downstream of the camera in the inspection system. Each photographic image 01 of a copy of the printed product in question can depict said copy in its entirety or only a selected portion or segment thereof. Said copy of the printed product in question or the portion or segment thereof has, in particular, within its printed image at least one element 03; 04 which is spatially constant with regard to a fixed reference point 02 of said copy of the printed product, and at least one element 06; 07; 08 which is spatially variant with regard to the same fixed reference point 02, wherein during a single imaging process of the respective copies of the printed product in question, both the at least one spatially constant element 03; 04 of said copy of the printed product and the at least one spatially variant element 06; 07; 08 of said copy of the printed product are captured simultaneously, so that the respective photographic image 01 of said copy of the printed product to be evaluated contains at least one spatially constant element 03; 04 and at least one spatially variant element 06; 07; 08. The copy in question of the printed product is configured, e.g. as rectangular, since the copy of the printed product is embodied, e.g. as a banknote or as a page of a security document. The fixed reference point 02 of said copy of the printed product in question is, e.g. a selected edge or a selected corner point of said copy of the printed product in question. In the example shown in FIG. 1, the at least one spatially constant element 03; 04 of said copy of the printed product in question is represented as a triangle or as a star, whereas the at least one spatially variant element 06; 07; 08 of said copy of the printed product is represented in each case as a strip that extends continuously across the copy in question, e.g. parallel to the narrow edge thereof.

Also during the learning phase of the inspection system, in a second process step that follows the image capturing step, the photographic image 01 of the relevant copy of the printed product in question is divided into two parts, e.g. by means of a separation process run in the control unit, in such a way that, from the generated photographic image 01 of the relevant copy of the printed product in question, the photographic image, contained therein, of the at least one element 06; 07; 08 which is spatially variant with regard to the fixed reference point 02 is separated from the photographic image of the at least one element 03; 04 which is spatially constant with regard to the fixed reference point 02 and which is likewise contained in the same generated photographic image 01 of the relevant copy of the printed product, wherein each of these two partial images is then further processed in a separate data processing branch—as indicated in FIG. 1 by different arrows. In this second process step, the at least one spatially variant element 06; 07; 08 is separated from the spatially constant element 03; 04, e.g. embodied as a background image, of the photographic image 01 of the relevant copy of the printed product in question.

In a third process step of the learning phase of the inspection system, following this separation, the photographic image of the at least one element 03; 04 which is spatially constant with regard to the fixed reference point 02 is stored, e.g. by the control unit, as a reference image that corresponds to the at least one spatially constant element 03; 04, in a first storage device 11 connected to the control unit, and the photographic image of the at least one element 06; 07; 08 which is spatially variant with regard to the fixed reference point 02 is also stored, e.g. by the control unit, as a reference image that corresponds to the respective at least one spatially variant element 06; 07; 08, in a second storage device 12 connected to the control unit. During the learning phase of the inspection system, a plurality of such reference images of copies of said printed product are preferably generated and stored, as indicated in FIG. 1 by reference images that are "stacked" in the storage devices 11; 12. In particular, if each of the copies of a specific printed product has a plurality of spatially variant elements 06; 07; 08 that are different from one another, a separate corresponding reference image is generated and stored for each of these spatially variant elements 06; 07; 08.

In an intermediate step in the photographic imaging of the at least one element 03; 04 which is spatially constant with regard to the fixed reference point 02 and/or for the photographic imaging of the at least one element 06; 07; 08 which is spatially variant with regard to the fixed reference point 02, preferably before the respective reference image is stored in one of the storage devices 11; 12, a global position correction 09 can be carried out, e.g. by executing a special computing process, in which for an anticipated and/or acknowledged change in position of the respective elements 03; 04; 06; 07; 08, the control unit calculates, e.g. in each of the data processing branches resulting from the separation, a motion vector to compensate for the position change anticipated and/or acknowledged in the relevant image, preferably in real time for each of said elements 03; 04; 06; 07; 08, with said motion vector being used, e.g. in a filter 13, in particular in a filtering process carried out by the control unit, in order to compensate for the respective change in position of the relevant spatially constant element 03; 04 and/or the spatially variant element 06; 07; 08 before the respective reference image is stored in one of the storage devices 11; 12 and/or before the respective comparison with the respective reference image is carried out.

As indicated in FIG. 1, the spatially variant elements 06; 07; 08 of the respective copy of the printed product, due to their spatial variability, can be offset such that they can no longer be captured by a standard frame used for imaging. For example, the situation can occur in which a shiny strip or Iriodin strip arranged in the respective copy of the printed product is displaced vertically in the printed image of the copy in question far enough that the strip is no longer captured in full by the standard frame that is used for image capturing carried out by the image capturing device of the inspection system. It can therefore be provided that this standard frame of the image capturing device is enlarged, e.g. by the control unit, at least in a direction which lies within the image capturing plane. For instance, an image capturing area that is limited, e.g. to 2048×1536 pixels, which in this example defines the image capturing frame, can be expanded, e.g. by means of a program, e.g. a digital zoom, to e.g. 2048×2048 pixels, in order to capture in a photographic image the entirety of a shiny strip which is vertically displaced, for example, and which is to be inspected, e.g. in a banknote printed on a printed sheet. For the inspection, it is important for the relevant or each spatially variant element 06; 07; 08 of the relevant copy of the printed product to also lie entirely within the expanded image capturing frame, to avoid losing any valuable information. This is represented by way of example in FIG. 2, wherein in FIG. 2, each of four spatially variant elements 06; 07; 08, each designed as a strip, is shown in combination with its respective range of variation in terms of its respective position.

Figure 2:
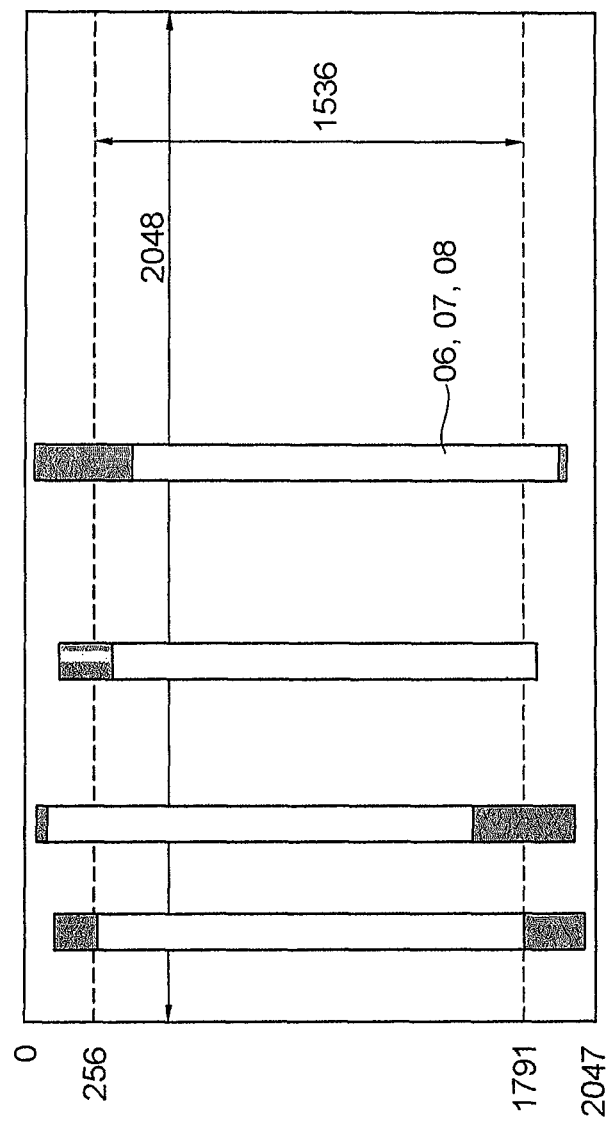
FIG. 2 an expanded frame for image capturing.
Figure 3:
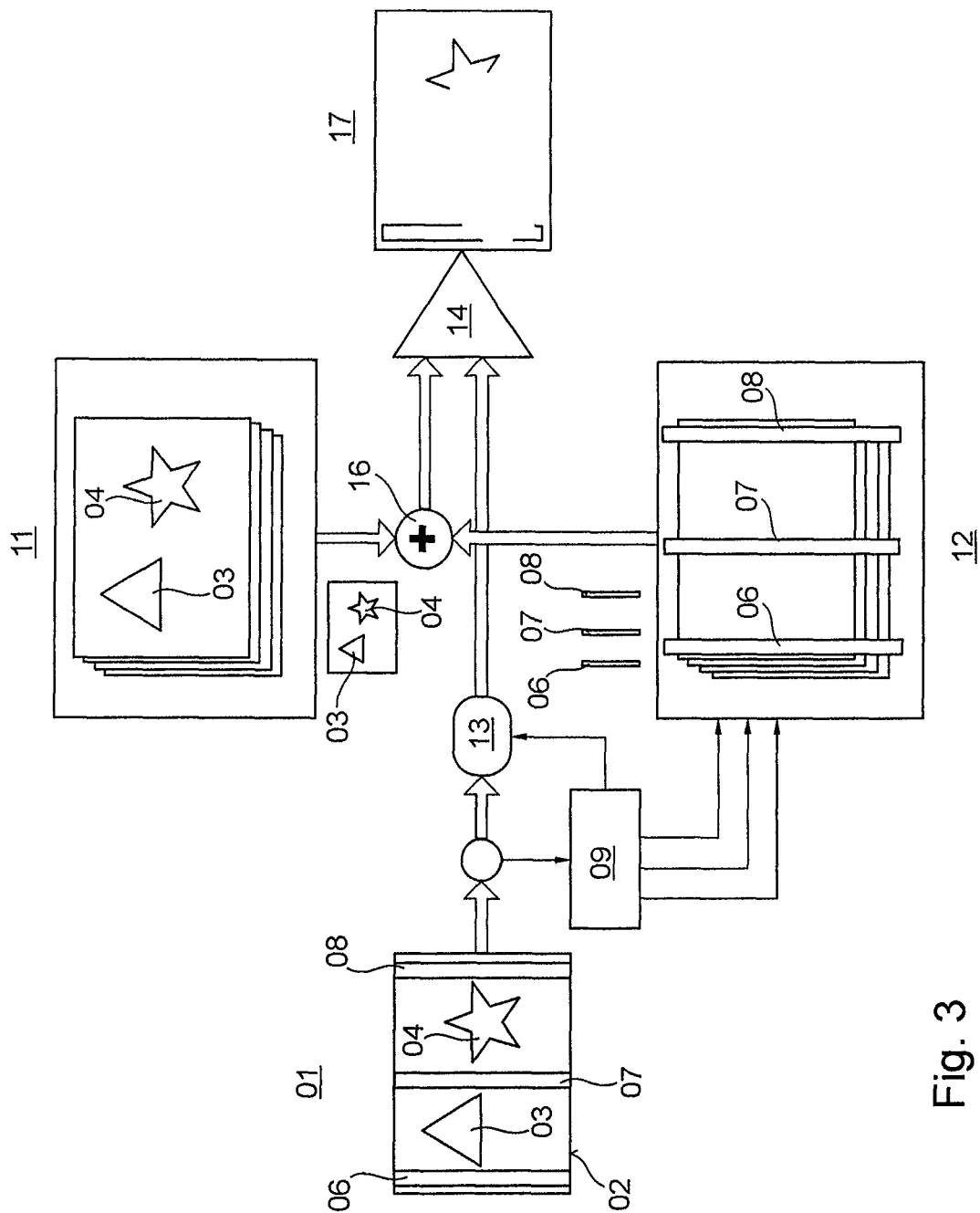
FIG. 3 a block diagram illustrating the process for inspecting at least one copy of the printed product.

FIG. 3 shows a block diagram illustrating the sequence of steps in the actual inspection of the preferably plurality of copies of the printed product. Once the inspection system has completed the learning phase, the control unit is switched automatically or manually from its mode that corresponds to the learning phase to its mode for carrying out the inspection. As previously during the learning phase, a photographic image 01 of the copy of the printed product to be inspected, currently generated by an image capturing device, e.g. by a camera, has both at least one element 03; 04 which is spatially constant with regard to a fixed reference point 02 and at least one element 06; 07; 08 which is spatially variant with regard to the same fixed reference point 02. In the illustrated example, the photographic image of the at least one element 03; 04 which is spatially constant with regard to the fixed reference point 02 and the photographic image of the at least one element 06; 07; 08 which is spatially variant with regard to the fixed reference point 02 are each subjected to a separate global position correction 09. For an anticipated and/or acknowledged change in position of the respective elements 03; 04; 06; 07; 08, the control unit calculates a motion vector, preferably in real time, for each of these elements 03; 04; 06; 07; 08, with said motion vector being used, e.g. in a filter 13, in particular in a filtering process carried out by the control unit by means of a program. The photographic image 01 which has been preprocessed in this manner, for example, of the copy of said printed product currently to be inspected is fed to a comparator 14, wherein said comparator 14 can also be embodied as a process that is executed in the control unit. Both the reference image which corresponds to the at least one spatially constant element 03; 04 and is stored in the first storage device 11 and the reference image which corresponds to the at least one spatially variant element 06; 07; 08 and is stored in the second storage device 12 are supplied to said comparator 14. The reference image which corresponds to the at least one spatially constant element 03; 04 and is stored in the first storage device 11 and the reference image which corresponds to the at least one spatially variant element 06; 07; 08 and is stored in the second storage device 12 may be combined, e.g. by the control unit, using data processing, e.g. in a single file, to produce a single virtual or synthetic reference image before the respective comparison is carried out, i.e. before said reference images are supplied to the comparator 14, as is indicated in FIG. 2 by summation point 16. Even if the data for the two stored reference images are combined, e.g. in the same file, the respective data content for the two reference images is maintained separately. In the comparator 14, the photographic image of the at least one spatially constant element 03; 04 which is contained in the currently generated photographic image 01 of the copy of the printed product to be inspected is compared with the reference image that corresponds to the at least one spatially constant element 03; 04, and the photographic image of the at least one spatially variant element 06; 07; 08 which is contained in the same currently generated photographic image 01 of said copy of the printed product to be inspected is compared with the reference image that corresponds to the at least one spatially variant element 06; 07; 08. If this comparison results in a discrepancy that exceeds or drops below a previously established permissible tolerance limit, the control unit will generate an error message 17, e.g. in the form of an error image that contains elements 03; 04; 06; 07; 08, only fragments of which are represented, for example, with said error image being displayed, e.g. on a monitor which is preferably connected to the control unit. The error image indicates, e.g. a difference between the generated photographic image 01 of the copy in question of the printed product to be inspected and, e.g. the virtual reference image that was generated in advance. If this discrepancy exceeds a previously established threshold, then the inspected copy of the printed product in question is considered defective; otherwise, it is considered sufficiently free of defects. Due to the prior generation of a separate reference image for the at least one spatially variant element 06; 07; 08 or the respective separate reference image for each of the spatially variant elements 06; 07; 08, during the inspection of the printed image of each copy of the printed product to be inspected, each relevant corresponding reference image is positioned on the respective spatially variable element 06; 07; 08 contained in the currently generated photographic image 01 of the respective copy of the printed product to be inspected. This is accomplished, for example, by the control unit checking, preferably in real time, e.g. in terms of pixels, whether the reference image stored for a specific spatially variant element 06; 07; 08 can be reconciled within a previously established permissible tolerance range with the respective current, particularly fully captured spatially variable element 06; 07; 08.

The invention provides a method for inspecting at least one copy of a printed product, a) wherein at least one first copy of said printed product and at least one second copy of the same printed product are produced in a printing process carried out in a printing machine, b) wherein a photographic image 01 of the at least one first copy of the printed product is generated by means of an image capturing device of an inspection system, c) wherein during a learning phase of the inspection system, which precedes the inspection, from the generated photographic image 01 of the at least one first copy of the printed product, a photographic image, contained therein, of at least one element 06; 07; 08 which is spatially variant with regard to a reference point 02 that is fixed for the copy in question is separated from a photographic image, contained in the same generated photographic image 01 of said first copy of the printed product, of at least one element 03; 04 which is spatially constant with regard to the same fixed reference point 02, d) wherein the image of the at least one spatially constant element 03; 04 obtained from the photographic image 01 of the at least one first copy of the printed product is used as a reference image for the respective at least one spatially constant element 03; 04, and the image of the at least one spatially variant element 06; 07; 08 obtained from the same photographic image 01 of the at least one first copy of the printed product is used as another reference image for the respective at least one spatially variant element 06; 07; 08, e) wherein during the inspection, which follows the learning phase, a photographic image 01 of the at least one second copy of the printed product is likewise generated by means of the image capturing device of the inspection system, f) wherein, from the photographic image 01 generated during the inspection of the at least one second copy of the printed product, a photographic image, contained therein, of at least one element 06; 07; 08 which is spatially variant with regard to a reference point 02 that is fixed for the copy in question is separated from a photographic image, contained in the same generated photographic image 01 of the relevant second copy of the printed product, of at least one element 03; 04 which is spatially constant with regard to the same fixed reference point 02, g) wherein the photographic image of the at least one spatially constant element 03; 04 contained in the photographic image 01 of the at least one second copy of the printed product is compared with the reference image obtained from the at least one first copy of the printed product and corresponding to the at least one spatially constant element 03; 04, and the photographic image of the at least one spatially variant element 06; 07; 08, contained in the same photographic image 01 of the same at least one second copy of the printed product, is compared with the respective reference image obtained from the at least one first copy of the printed product and corresponding to the relevant spatially variant element 06; 07; 08.

Advantageous embodiments and/or developments which can be used in conjunction with the above method in any combination, provide particularly a) that the respective separation of the at least one element 06; 07; 08 which is spatially variant with regard to the fixed reference point from the photographic image of the at least one element 03; 04 which is spatially constant with regard to the fixed reference point, and which is contained in the same generated photographic image 01 of the relevant first or second copy is carried out by means of a filter or by means of a filtering process, b) that during the learning phase, which precedes the inspection, following the separation step, at least one photographic image of the at least one element 03; 04 which is spatially constant with regard to the fixed reference point 02 is stored in a first storage device 11 as the reference image which corresponds to the at least one spatially constant element 03; 04, and at least one photographic image of the at least one element 06; 07; 08 which is spatially variant with regard to the fixed reference point 02 is stored in a second storage device 12 as the reference image which corresponds to the respective spatially variant element 06; 07; 08, c) that, in the at least one first copy of the printed product and/or in the at least one second copy of the printed product, a position correction 09 is carried out for the respective at least one photographic image of the at least one element 03; 04 which is spatially constant with regard to the fixed reference point 02 and/or for the respective at least one photographic image of the at least one element 06; 07; 08 which is spatially variant with regard to the fixed reference point 02, in which position correction, for each anticipated and/or acknowledged change in position of the respective elements 03; 04; 06; 07; 08, a motion vector is calculated to compensate for the anticipated and/or acknowledged change in position in the image in question, d) that the compensation for the anticipated and/or acknowledged change in position in the at least one first copy of the printed product is carried out before the respective reference image is stored in one of the storage devices 11; 12, e) that the compensation for the anticipated and/or acknowledged change in position in the at least one second copy of the printed product is carried out before the respective comparison with the respective reference image is carried out, f) that the separation of the photographic image 01 of the at least one first copy of the printed product and/or the separation of the photographic image 01 of the at least one second copy of the printed product is or are carried out or at least controlled by a control unit, g) that the execution of the position correction 09 and/or the storage of the respective reference image in one of the storage devices 11; 12 is or are carried out or at least controlled by the control unit, h) that the separation of the photographic image 01 of the at least one first copy of the printed product and/or the separation of the photographic image 01 of the at least one second copy of the printed product are each carried out in real time, i) that the execution of the position correction 09 and/or the storage of the respective reference image in one of the storage devices 11; 12 are each carried out in real time, j) that a standard frame of the image capturing device which serves to capture the image is enlarged by the control unit in at least one direction that lies within the image capturing plane, k) that an edge of the relevant copy of the printed product or the center thereof is used in each case as the fixed reference point 02 of said copy of the printed product, l) that this method is used in security printing or in package printing, m) that a banknote or a security document or a folding box is used as the printed product, n) that a shiny strip or a pearlescent strip or an Iriodin strip incorporated into the relevant copy of the printed product is used as the at least one spatially variant element 06; 07; 08 of the relevant first and/or second copy of the printed product, o) that during the inspection of the printed image of the at least one second copy of the printed product, the respective relevant corresponding reference image of the at least one spatially variant element 06; 07; 08 is positioned, e.g. using image processing software, on the respective spatially variable element 06; 07; 08 contained in the currently generated photographic image 01 of the respective at least one second copy of the printed product to be inspected, p) that the reference image that corresponds to the at least one spatially constant element 03; 04 and is stored in the first storage device 11, and the reference image that corresponds to the at least one spatially variant element 06; 07; 08 and is stored in the second storage device 12 are combined at a summation point 16 by means of data processing to produce a single virtual or synthetic reference image, after which the relevant reference images that have been combined to form the virtual or synthetic reference image are supplied to the comparator 14, wherein in the virtual or synthetic reference image, the respective data content of each of these combined reference images is maintained separately.

While a preferred embodiment of a method for inspecting at least one printed product, in accordance with the present invention, has been set forth fully and completely hereinabove, it will be apparent to one of skill in the art that various changes in, for example the method of printing the printed copies, the photographic capture device and the like could be made without departing from the true spirit and scope of the subject invention which is accordingly to be limited only by the scope of the appended claims.

What is claimed is:

1. A method for inspecting at least one copy of a printed product, including:
    producing at least one first copy of said printed product and at least one second copy of the same printed product in a printing process using a printing machine;
    providing an inspection system having an image capturing device;
    generating a photographic image of the at least one first copy of the printed product using said image capturing device of the inspection system;
    providing a learning phase of the inspection system, which learning phase precedes the inspecting of the at least one second copy of the printed product, and using the generated photographic image of the at least one first copy of the printed product, during a subsequent inspection phase;
    separating, during said learning phase, a first photographic image of at least one first element of the at least one first copy of the printed product and which is spatially variant with regard to a reference point that is fixed for the at least one first copy of the printed product, from a second photographic image, contained in the same generated photographic image of the at least one first copy of the printed product, of at least one element and which is spatially constant with regard to the same fixed reference point;
    using the first photographic image of the at least one spatially variant element obtained from the generated photographic image of the at least one first copy of the printed product as a first reference image for the at least one spatially variant element;
    using the second photographic image of the at least one spatially constant element obtained from the same generated photographic image of the at least one first copy of the printed product as a second reference image for the at least one spatially constant element;
    generating, during the inspection phase of the inspection system, a photographic image of the at least one second copy of the printed product by using the image capturing device of the inspection system;
    separating, from the photographic image generated during the inspection of the at least one second copy of the printed product, a third photographic image of at least one element which is spatially variant with regard to a reference point that is fixed for the at least one second copy of the printed product from a fourth photographic image, contained in the same generated photographic image of the at least one second copy of the printed product, of at least one element which is spatially constant with regard to the same fixed reference point;
    providing first and second storage devices for said first and second reference images;
    comparing the third photographic image of the at least one spatially variant element, contained in the generated photographic image of the at least one second copy of the printed product with the first reference image obtained from the at least one first copy of the printed product and corresponding to the at least one spatially variant; and
    comparing the fourth photographic image of the at least one spatially constant element, contained in the generated photographic image of the at least one second copy of the printed product with the respective second reference image obtained from the at least one first copy of the printed product and corresponding to the at least one spatially constant element.

2. The method according to claim 1, further including separating the first photographic image of the at least one element which is spatially variant with regard to the fixed reference point from the second photographic image of the at least one element which is spatially constant with regard to the fixed reference point and which is contained in the same generated photographic image of the one of the first and second copy of the printed product using one of a filter and a filtering process.

3. The method according to claim 1 further including storing, during the learning phase and following the separation step, the at least one photographic image of the at least one element which is spatially variant with regard to the fixed reference point in the first storage device as the first reference image that corresponds to the at least one spatially variant element, and storing at least one photographic image of the at least one element which is spatially constant with regard to the fixed reference point in the second storage device as the second reference image that corresponds to the at least one spatially constant element.

4. The method according to claim 1, further including, in at least one of the at least one first copy of the printed product and in the at least one second copy of the printed product, carrying out a position correction for at least one of the at least one photographic image of the at least one element which is spatially constant with regard to the fixed reference point and for the respective at least one photographic image of the at least one element which is spatially variant with regard to the fixed reference point, and further including calculating a motion vector, for each of an anticipated and acknowledged change in a position of the respective elements for compensating for the one of an anticipated and acknowledged change in position in the image.

5. The method according to claim 4 further including carrying out the compensation for the one of the anticipated and acknowledged change in position in the at least one first copy of the printed product before the reference image is stored in one of the first and second storage devices.

6. The method according to claim 4 further including carrying out the compensation for the one of the anticipated and acknowledged change in position in the at least one second copy of the printed product before carrying out the comparison with the reference image.

7. The method according to claim 1 further including providing a control unit and using the control unit for carrying out the separation of at least one of the photographic image of the at least one first copy of the printed product and the separation of the photographic image of the at least one second copy of the printed product.

8. The method according to claim 4 further including providing a control unit and using the control unit for carrying out the execution of the at least one of the position correction and a storage of the respective reference image in one of the first and second storage devices.

9. The method according to claim 1 further including carrying out the separation of the photographic image of the at least one first copy of the printed product and the separation of the photographic image of the at least one second copy of the printed product in real time.

10. The method according to claim 1 further including carrying out the execution of the one of the position correction and the storage of the respective reference image in one of the first and second storage devices in real time.

11. The method according to claim 1 further including providing a control unit and using that control unit for enlarging a standard frame of the image capturing device which serves to capture the image in at least one direction that lies within an image capturing plane of the image capturing device.

12. The method according to claim 1 further including using one of an edge of the copy of the printed product and the center thereof as the fixed reference point of the copy of the printed product.

13. The method according to claim 1 further including using the method for inspecting at least one copy of a printed product in at least one of security printing and package printing.

14. The method according to claim 1 further including providing said at least one copy of a printed product as one of a banknote, a security document and a folding box.

15. The method according to claim 1 further including placing one of a shiny strip, a pearlescent strip and an Iriodin strip into the of the printed product and which is used as the at least one spatially variant element of the one of the first and second copy of the printed product.

16. The method according to claim 1 further including, during the inspection of the printed image of the at least one second copy of the printed product, positioning the corresponding reference image of the at least one spatially variant element on the respective spatially variable element contained in the photographic image of the respective at least one second copy of the printed product to be inspected.

17. The method according to claim 1 further including combining the reference image that corresponds to the at least one spatially constant element, and which is stored in the first storage device and the reference image that corresponds to the at least one spatially variant element, and which is stored in the second storage device at a summation point by using data processing for producing one of a single virtual and a synthetic reference image, after which the relevant reference images that have been combined to form the one of the virtual and synthetic reference image are supplied to a comparator in which the one of the virtual and synthetic reference image and the respective data content of each of these combined reference images is maintained separately.

\* \* \* \* \*

UNITED STATES PATENT AND TRADEMARK OFFICE
CERTIFICATE OF CORRECTION

PATENT NO. : 9,256,931 B2
APPLICATION NO. : 14/420676
DATED : February 9, 2016
INVENTOR(S) : Stefan Bless et al.

Page 1 of 1

It is certified that error appears in the above-identified patent and that said Letters Patent is hereby corrected as shown below:

Claims

In column 10, claim 2, line 43, after "variant" insert --element--; and

In column 12, claim 15, line 21, after "the" (first occurrence), insert --copy--.

Signed and Sealed this
Tenth Day of May, 2016

Michelle K. Lee
*Director of the United States Patent and Trademark Office*